United States Patent [19]

Pinner et al.

[11] 3,753,603

[45] Aug. 21, 1973

[54] BEARING ASSEMBLIES FOR THE ROLLERS OF A ROLLER CONVEYOR

[75] Inventors: Bernard Pinner, Wednesbury; Edmund Charles King, Sedley, Dudley, both of England

[73] Assignee: Brockhouse Conveyor Bearings Limited, Tipton, Stafford, England

[22] Filed: Dec. 2, 1971

[21] Appl. No.: 204,099

[30] Foreign Application Priority Data
Dec. 8, 1970 Great Britain.................. 58,146/70

[52] U.S. Cl..................................... 308/20, 193/37
[51] Int. Cl. ........................................... F16c 35/00
[58] Field of Search ................. 308/20, 196; 193/37

[56] References Cited
UNITED STATES PATENTS

| | | | |
|---|---|---|---|
| 1,660,512 | 2/1928 | Jaenicke | 308/20 |
| 1,141,515 | 6/1915 | Alvey | 308/20 |
| 2,768,725 | 10/1956 | Foulds | 308/20 |
| 3,250,581 | 5/1966 | Honroth | 308/20 |

FOREIGN PATENTS OR APPLICATIONS

| | | | |
|---|---|---|---|
| 935,741 | 9/1963 | Great Britain | 308/20 |
| 820,881 | 9/1959 | Great Britain | 308/20 |

Primary Examiner—Charles J. Myhre
Assistant Examiner—R. H. Lazarus
Attorney—Charles J. Merriam, Alvin D. Shulman et al.

[57] ABSTRACT

A bearing assembly for fitting in the ends of a tube which forms a roller of a roller conveyor, such bearing assembly comprising an outer pressing which has a skirt and an annular plate, an inner pressing forming an outer part of a ball race and a centre roller forming an inner part of a ball race, and having a central bore for fitting on a spindle. The skirt is frusto-conical and extends from a rolled-over flange at the periphery of the outer pressing, such flange also engaging over the periphery of the inner pressing, and the end of the roller tube being peened over into engagement with the skirt when the bearing assembly is fitted into the end of the tube.

3 Claims, 4 Drawing Figures

Patented Aug. 21, 1973 3,753,603

BEARING ASSEMBLIES FOR THE ROLLERS OF A ROLLER CONVEYOR

BACKGROUND OF THE INVENTION

1. Field of the Invention

This invention relates to an improved bearing assembly for use in the ends of a roller which is one of a plurality of rollers arranged with their axes in parallel relationship for the transport therealong of goods and articles.

The roller is formed from a length of tube and a bearing assembly is fitted into each end of the tube for the mounting of the roller on a spindle which is generally carried by side frames of the complete conveyor assembly. The bearing assembly to which the present invention relates is of the type comprising an outer shell, an inner pressing fixed within the outer shell and a centre roller having a central bore by means of which the bearing assembly is mounted upon the spindle of the complete roller.

Hereinafter a bearing assembly having the above specified features is referred to as being a bearing assembly "of the type specified".

2. Description of the Prior Art

As hitherto constructed, a bearing assembly of the type specified has an outer shell which is provided with a cylindrical skirt which is adapted to be a force fit in the end of the tube forming the roller. Generally the manufacture of the bearing assembly is separate from the manufacture of the rollers for a complete conveyor and the conveyor manufacturer receives complete bearing assemblies from a manufacturer of bearing assemblies. With the hitherto specified form of construction of this type of bearing assembly this has led to the following disadvantages.

As the skirt of the bearing assembly is only a force fit in the end of the roller tube there is no restraint upon the bearing assembly being displaced outwardly of the tube unless, as some manufacturers have done, there is performed a separate operation on the outside of the roller tube to dimple the tube inwardly at a number of spaced points to provide a better fixing between the tube and the bearing assembly. This requires a separate operation by the manufacturer of the conveyor and is not entirely satisfactory.

Also, in practice, owing to the tolerance which is permitted in the manufacture of tube and the tolerance which will exist in the manufacture of the outer shell of the bearing assembly, there is no guarantee that all bearing assemblies will have an outer shell with a skirt of the correct diameter to form the desired force fit with the interior of the end of the roller tube. If the skirt diameter is under size or the internal diameter of the end of the tube is over size then the required degree of force fit will not be obtained and there is danger of the bearing assembly working loose and coming out of the end of the tube. If the opposite condition exists and the diameter of the bearing assembly is over size or the internal diameter of the end of the tube is under size then in forcing the skirt into the end of the tube a distortion of the end of the tube is obtained and this appears as a bulge near the end of the roller.

The object of the invention is to provide an improved bearing assembly of the type specified which will obviate the above mentioned disadvantages.

SUMMARY OF THE INVENTION

According to the invention we provide a bearing assembly of the type specified wherein the outer shell comprises an annular plate and a skirt extending from the periphery of the plate, said skirt being deformed in a radially inwards direction to provide a shoulder facing outwardly away from the plate and a frusto-conical skirt portion extending away from the shoulder, the larger diameter of the skirt portion being remote from the shoulder.

Hitherto, with this type of bearing assembly constructed as hereinbefore mentioned, a further disadvantage has been that the end of the tube forming the roller provides a relatively sharp edge which can prove a nuisance to operators whose clothing can be damaged by contact with these rotating sharp edges and which also provides a sharp obstruction when goods and articles are being moved on to the roller conveyor in a direction transverse to the length thereof as frequently happens in some assemblies where one conveyor is delivering goods on to a roller conveyor which is transverse thereto and thus the goods and articles can be obstructed by the sharp edges provided by the ends of the rollers and may have to be manipulated thereover.

A further object of the invention is to provide a complete roller assembly in which the above mentioned disadvantage is obviated.

With this object in view, according to the invention there is provided a roller assembly for a roller conveyor comprising a tube having fitted in each end thereof a bearing assembly of the type specified and wherein each bearing assembly has an outer shell comprising an annular plate and a skirt extending from the periphery of the plate, said skirt being deformed in a radially inwards direction to provide a shoulder facing outwardly away from the plate and a frusto-conical skirt portion extending away from the shoulder, the larger diameter of the skirt portion being remote from the shoulder, the shoulder having a depth, measured radially outwardly from the smaller diameter of the skirt portion, approximately equal to the wall thickness of the tube and the end portion of the tube having been deformed radially inwardly so that the interior thereof engages the whole of the skirt portion and the end face thereof engages said shoulder.

BRIEF DESCRIPTION OF THE DRAWINGS

An embodiment of the invention is hereinafter described by way of example with reference to the accompanying drawings wherein.

DESCRIPTION OF THE PREFERRED EMBODIMENT

Figure 1:
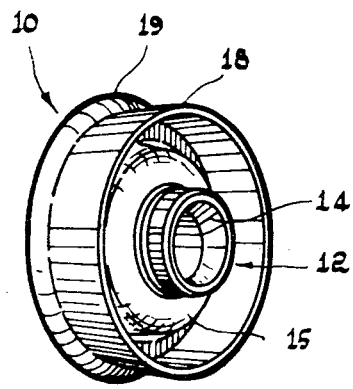
FIG. 1 is a perspective view of a bearing assembly according to the invention.
Figure 2:
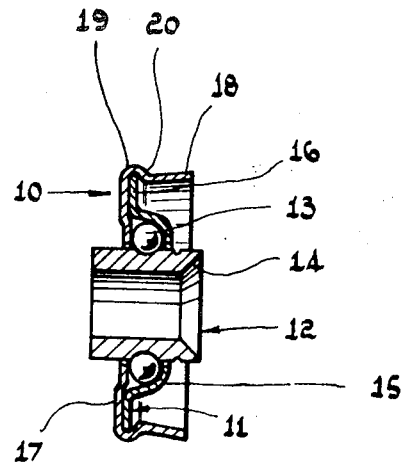
FIG. 2 is a section in side elevation on a centre line of the bearing assembly.
Figure 3:
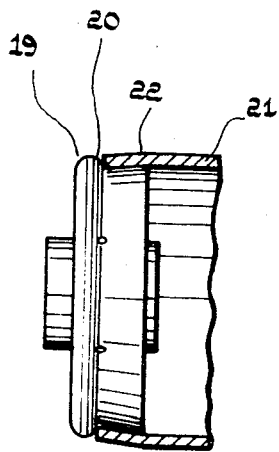
FIG. 3 is a scrap view of one end of the roller of a roller conveyor having the bearing assembly of FIG. 1 fitted therein.

With reference to FIGS. 1 to 3 it will be appreciated that the complete roller assembly has a bearing assembly fitted in each end thereof (only the one end being shown in FIG. 3).

Each bearing assembly includes an outer shell 10, an inner pressing 11, a centre roller 12 which has a bore which receives a portion of the mounting spindle (not shown) for the roller and a series of balls 13 located between an inner race afforded by the centre roller 12 and an outer race defined partially by the outer shell 10 and partially by the inner pressing 11.

The centre roller 12 is of generally cylindrical form being provided with an annular groove in its outer surface to receive the balls and having a generally cylindrical through bore which, at that end thereof which will face inwardly of the roller, is provided with a tapering lead-in portion 14 to facilitate fitment to the mounting spindle.

The inner pressing 11 includes a domed inner portion 15 which fits over the centre roller and provides the innermost part of the outer race of the bearing assembly and said domed portion is formed integral with an annular flange 16 which is located in abutment with an annular plate 17 forming part of the outer shell of the bearing assembly.

The outer shell 10 includes an initially cylindrical skirt 18 which is formed integral with the annular plate 17 and the cylindrical skirt projects from the annular plate inwardly of the roller when the bearing assembly is fitted in an end of the roller.

In assembling the bearing assembly, the outer shell 10, centre roller 12 and balls 13 are assembled together and then the inner pressing 11 is positioned in engagement with the outer shell and may be temporarily located in engagement therewith by forming dimples in the cylindrical skirt.

With the parts of the bearing assembly thus held together the cylindrical skirt is then deformed radially inwardly to the frusto-conical form in FIG. 2. The rolled-over flange 19 provides a shoulder 20 facing outwardly away from the annular plate 17 and also engages over the periphery of the inner pressing 11 to fix this rigidly to the outer shell. The larger diameter of the frusto-conical portion of the skirt is slightly less than the peripheral diameter of the rolled-over flange 19.

Referring to FIG. 3, the bearing assembly of FIG. 2 is fitted into the end of the tube 21 which comprises the conveyor roller in the following manner. Prior to the fitting of the bearing assembly the end portion 22 of the tube 21 is undeformed and the internal diameter of the tube 21 is such that it can receive the larger diameter of the frusto-conical skirt portion as a reasonably close fit without the necessity for any force fitting and as this larger diameter is slightly less than the peripheral diameter of the rolled-over flange 19 the initial insertion of the bearing assembly into the end portion 22 of the tube brings the end face of this portion 22 into engagement with the shoulder 20 so as to correctly locate the bearing assembly in the end of the tube. Thereafter the end portion 22 is rolled over into the form shown in FIG. 3 so that it is deformed radially inwardly and its interior engages the whole of the skirt portion and its end face is in engagement against the shoulder 20. Thus with this arrangement the bearing assembly is firmly locked in the end of the tube and the frusto-conical form of the skirt prevents any outwards movement of the bearing assembly relative to the tube and the engagement of the end face of the portion 22 of the tube against the shoulder 20 prevents an inwards movement of the bearing assembly so that it is positively and rigidly locked in position in the end of the tube.

Further, it will be observed that the depth of the shoulder 20 measured radially outwardly from the smaller diameter of the frusto-conical skirt portion is approximately equal to the wall thickness of the tube 21 so that in the completed assembly as shown in FIG. 3 the outer surface of the end portion 22 of the tube and the peripheral edge of the rolled-over flange 19 are substantially flush and the end of the roller has a smooth outwardly tapered form and does not have any sharp angular edge.

Also, as the bearing assembly does not rely upon force fitting into the end of the tube 21 to hold it in position the disadvantage of an oversize skirt diameter in relation to the internal diameter of the tube is eliminated and there is no danger of bulging the end of the tube when the bearing assembly is being fitted. Thus, in all cases the outer end portion of the tube at each end always has the smooth tapered form and sharp angular edges and bulges in the ends of the tube of the roller are eliminated.

Figure 4:
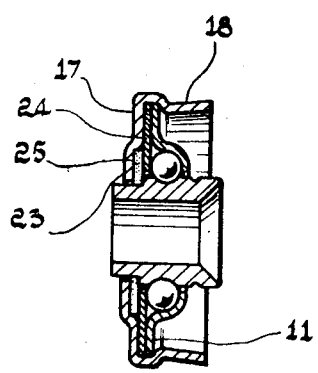
FIG. 4 is a view similar to FIG. 2 showing a modified form of bearing assembly.

In the modified form of bearing assembly shown in FIG. 4, the majority of the parts and the method of assembly is the same as shown in the bearing assembly of FIG. 2 and like numbers are used for indicating such parts. In addition to the inner pressing 11 the assembly shown in FIG. 4 has a hardened washer 24 which is trapped between the annular plate 17 and the inner pressing 11. The annular plate 17 has an outwardly dished portion 23 at its centre providing a space between this portion 23 and the hardened washer 24 which accommodates a felt washer 25 to seal the bearing assembly against ingress of dirt.

Instead of a ball race, the centre roller may be replaced by a bush made from any suitable bearing material, including a plastic material such as nylon, and having an integral collar in place of the balls as shown in the drawings, to provide the bearing upon which the inner pressing rotates.

The tube of each roller may be of aluminium, steel or a synthetic plastics material and each bearing assembly may be fabricated from mild steel, brass, stainless steel or aluminium components. The components of each bearing assembly may be cadmium plated or other surface finished.

We claim:

1. A roller assembly for a roller conveyor comprising a tube having fitted in each end thereof a bearing assembly of the type specified including an outer shell and an inner pressing and wherein each outer shell comprises an annular plate and a skirt extending from the periphery of the plate in the direction inwardly of the roller, said skirt being deformed in the radially inwards direction prior to fitting in the end of the roller to provide a shoulder facing outwardly away from the plate in the direction inwardly of the roller and a frusto-conical skirt portion extending away from the shoulder in the direction inwardly of the roller, the larger diameter of the skirt portion being remote from the shoulder, the shoulder having a depth, measured radially outwardly from the smaller diameter of the skirt portion, approximately equal to the wall thickness of the tube and the end portion of the tube having been deformed radially inwardly so that the interior thereof engages the whole of the skirt portion and the end face thereof engages said shoulder.

2. A roller assembly according to claim 1 wherein, for each bearing assembly, there is, between the annular plate and the skirt, a rolled-over flange which engages over the periphery of the inner pressing and provides said shoulder, the peripheral diameter of said flange being in excess of the larger diameter of the frusto-conical skirt portion and the periphery of said flange being substantially flush with the radially inwardly deformed end portion of the roller.

3. A bearing assembly of the type specified including an outer shell and an inner pressing, wherein the outer shell comprises an annular plate and a frusto-conical skirt joined to the annular plate by its smaller diameter end, the periphery of the annular plate being rolled over to engage over the periphery of the inner pressing and to form a shoulder facing in the direction towards the larger end of the skirt, the peripheral diameter of said shoulder being greater than the diameter of the larger end of the skirt.

* * * * *